Figure 1:
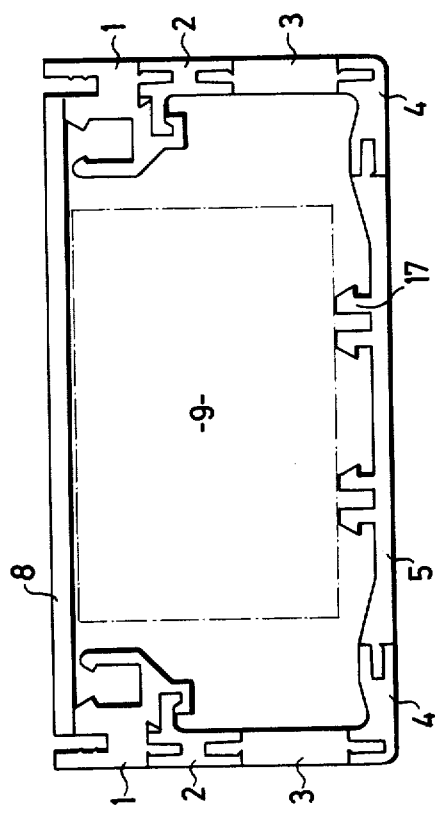

United States Patent [19]
Johannsen

[11] 3,927,698
[45] Dec. 23, 1975

[54] INSTALLATION CHANNEL
[75] Inventor: Rolf Johannsen, Traunreut, Germany
[73] Assignee: Intermercury Finance and Trading Co., Ltd., Grand Cayman, British W. Indies
[22] Filed: June 6, 1974
[21] Appl. No.: 476,771

[30] Foreign Application Priority Data
July 24, 1973 Germany............................ 2337628

[52] U.S. Cl. .................. 138/162; 138/157; 52/731; 174/97; 174/101
[51] Int. Cl.² ........................................... F16L 9/22
[58] Field of Search ............. 138/157, 162; 52/731; 174/97, 101; 312/263

[56] References Cited
UNITED STATES PATENTS

| 378,561 | 2/1888 | Waring ............................. 138/115 X |
| 1,158,378 | 10/1915 | Fullerton et al. ...................... 138/162 |
| 3,398,499 | 8/1968 | Moore et al. .......................... 52/731 |
| 3,403,220 | 9/1968 | Riedel et al...................... 138/162 X |

Primary Examiner—John W. Huckert
Assistant Examiner—James E. Bryant, III
Attorney, Agent, or Firm—Charles W. Helzer

[57] ABSTRACT

A service installation channel for accomodating gas, water, electricity and similar piped or cabled service conduits for commercial and residential housing. The service installation channel is formed from a plurality of standardized, strip-like components connected in a successive manner at their longitudinal edges with complimentary tongue-and-groove joints that provide positive interlocking connection. There are at least two uppermost strip-like components forming each sidewall with the two upper most strip-like components of each sidewall having a first tongue-and-groove joint similar to those between other adjacent pairs of interconnected strip-like components comprising the service installation channel and an additional interconnected tongue-and-groove joint extending laterally inwardly adjacent the said first tongue-and-groove joint.

6 Claims, 6 Drawing Figures

INSTALLATION CHANNEL

In the building industry the generally accepted practice heretofore has been to produce continuous floors, walls and the like and thereafter to make suitable recesses in the wall or floor members for receipt of gas, water, electricity and similar piped or cabled service conduits. Recently, however, the practice has been changed to provide recesses during the initial construction which recesses themselves receive channels to house the services and have covers that are located flush with the floor or wall. This last technique is particularly useful for large premises such as factories, offices, hospitals, and so on, since the initial installation costs are reduced and subsequent inspection and maintenance of the service conduits are simplified by the provision of removable covers. In relatively large rooms, service installation channels provided in this way have the further advantage that they are readily accessible and connections, such as for electrical power and telephones, do not have to be extended over large distances from a wall socket or other such outlet.

However, a disadvantage of the use of such channels arises from the need to provide and stock a considerable range of different width and depth channels to meet the requirements of different installation situations.

One object of the present invention is to overcome this disadvantage and for this purpose a service installation channel is provided which is formed from a plurality of standardized, strip-like components connected in successive manner at their longitudinal edges with complementary tongue-and-groove joints.

In another aspect of the invention, a set of standardized, strip-like components are provided which are adapted for ready interconnection to form service installation channels of varying size and description.

Figure 2:
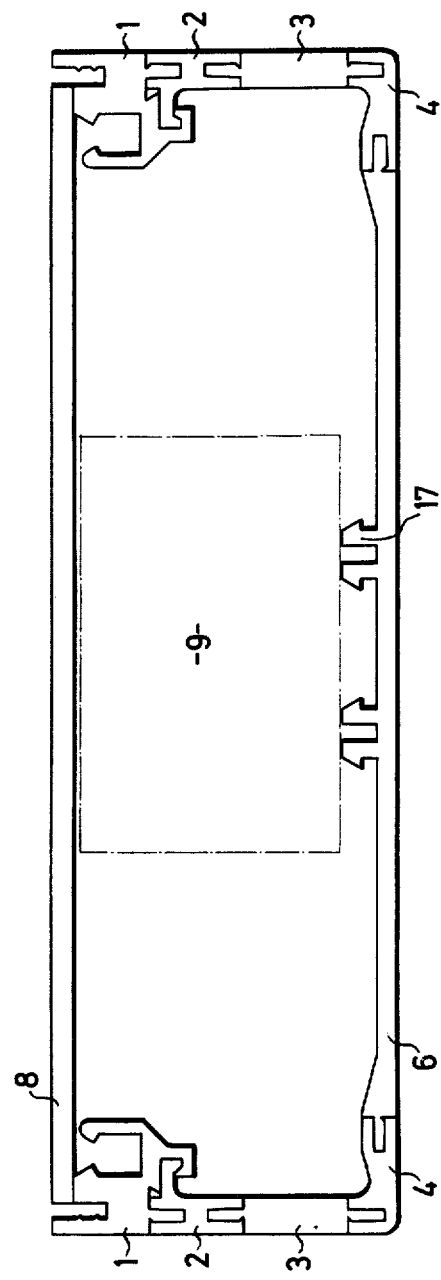
Figure 3:
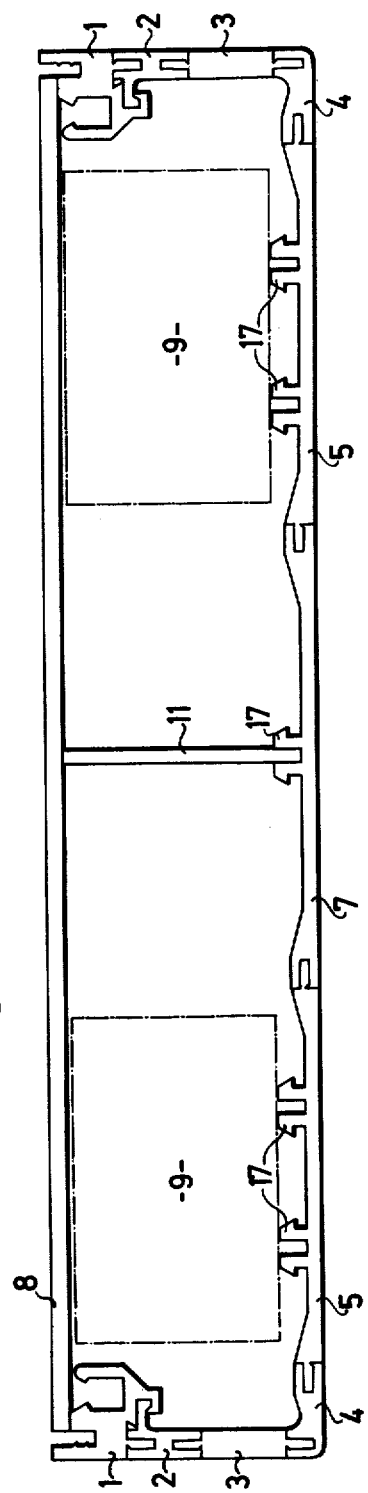
Figure 4:
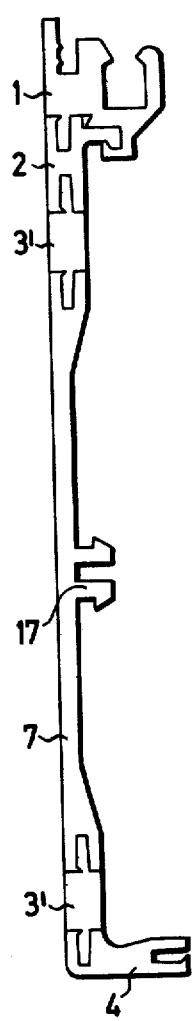
Figure 5:
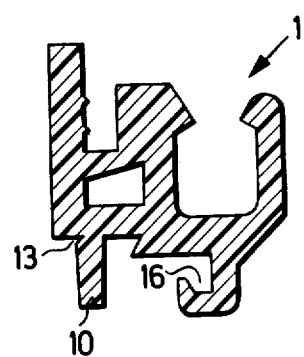
Figure 6:
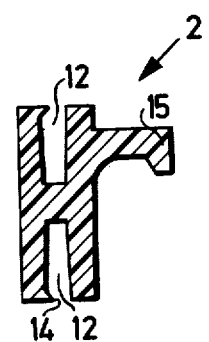

For a fuller understanding of the present invention, service installation channels according to the invention will now be described, by way of example, with reference to the accompanying drawings, in which:

FIGS. 1, 2 and 3, respectively, illustrate end elevation views of three different size service installation channels having different widths, and all of which are made from interconnecting sets of standardized components in accordance with the invention;

FIG. 4 illustrates one side wall of a service installation channel of greater depth than those of FIGS. 1–3, and constructed according to the invention; and FIGS. 5 and 6, respectively, illustrate in cross-sectional view the two uppermost side wall components of the service installation channels shown in FIGS. 1–4.

The service installation channel shown in FIG. 1 has an overall, generally rectangular cross-section in which each side wall is similar in construction and comprised by an uppermost strip-like component 1 described in more detail hereinafter with reference to FIG. 5. For the present purposes, it is sufficient to note that the component 1 may be of extruded or stamped metal or plastic construction having an identical cross-sectional configuration throughout its length into the plane of FIG. 1. Component 1 is provided with an inwardly facing lip of reduced height to support a cover 8 in flush manner with the top of the channel, and a lower peripheral downwardly projecting tongue 10 as shown in FIG. 5. This tongue is connected in a complementary groove formed in the upper peripheral edge of an adjacent interlocking component 2 which has a corresponding mirror image groove in its lower peripheral edge.

The next lower or adjacent interlocking component 3 has respective mirror-image tongues at its upper and lower peripheral edges, which tongues correspond to that of component 1. The upper tongue of component 3 connects in the lower groove of component 2, and the lower tongue of component 3 connects with a corresponding groove in the upper peripheral edge of a lower corner component 4 of generally L-shape cross-section.

The lower peripheral edge of L-shape component 4 has a mirror-image groove to receive a corresponding tongue of a base component 5 which has a mirror-image tongue at its opposite peripheral edge for connection to a further succession of interlocking side wall components 4, 3, 2 and 1, similar to those previously described to form the opposite side wall of the service installation channel. The base component 5 is additionally formed with two upstanding projections 17 of like slotted form having outer side surfaces which are first outwardly divergent towards the main body of the component 5 and then relieved or undercut. These projections can serve for the connection of various additional parts, such as an equipment channel box 9 shown in broken outline, the connection being provided by suitable tongues formed on the additional parts and received in the slots or jaw-like connectors snapped over the undercut upper edges of the upstanding projections. All of the strip-like components similar to component 1 may be of extruded or stamped metal or plastic, and have essentially the same cross-section depicted in FIG. 1 throughout their length into the plane of the paper as illustrated in FIG. 1.

The service installation channel of FIG. 2 is fabricated from similar standardized strip-like components to those shown in FIG. 1 except for the use of a wider base component 6 in place of the otherwise identical component 5. The associated cover will, of course, be correspondingly wider.

The service installation channel of FIG. 3 is similar to those of FIGS. 1 and 2 except that is includes a yet wider base which, in this case, is made with three standard, strip-like components. As shown in FIG. 3, a central base, strip-like component 7 with slots at its edges is flanked by two of the components 5. The additional component 7 is formed with a single upstanding projection 17 which receives a partition wall 11. The wall 11 serves two functions. First, it serves to subdivide the resulting service installation channel into two which can, for example, respectively serve to carry high and low power electricity cables. Second, wall 11 also serves to support the central region of the correspondingly wider cover 8.

The partial installation service channel of FIG. 4 is provided with a sidewall similar to those shown in FIGS. 1, 2 or 3, but is deeper. In this case, the side walls of the service installation channel are extended by adding to the strip-like components 1 and 2 in each side wall, not only a component 3', which is similar to component 3 described with relation to FIG. 1, but also a component 7, and lastly another component 3' connected to a corner component 4. Use of the component 7 allows for the provision of an intermediate base or floor which may be secured to the projection 17. If desired, several such floors can be provided by the provision of additional projections 17 in the elongated side wall construction.

FIGS. 5 and 6 illustrate the standard, strip-like components 1 and 2 on an enlarged scale and in greater cross-sectional detail. The component 1 is seen to include a tongue 10 which is slightly convergently tapered towards its outer end and provided with an undercut or recess 13 at its bottom connection to the main body of component 1. As shown in FIG. 6, the upper slot 12 of component 2 is of a complementary form with a flange 14 to snap into the tongue recess 13 when the tongue and groove of the two components are interconnected. It is to be noted that the flange 14 is outwardly convergent to facilitate release of the tongue from an associated groove. Conveniently, all of the tongue and groove connections heretofore described are effectively identical in form apart from the question of mirror imaging.

FIGS. 5 and 6 also show additional tongue and groove parts for strong interconnection of components 1 and 2. Thus, component 1 is extended at one side to form a lip for receiving a cover on the upper surface of such extension as described above, and the underpart of this extension is formed with a slotted groove 16 opening upwardly towards the tongue 10. This slotted groove receives a tongue 15 extending from one side of the associated groove 12 in the component 2. Preferably, the groove 16 is enlarged towards its base and the tongue 15 is correspondingly enlarged towards its free end to afford a snap fit between these parts in similar manner to that with the tongue 10 and groove 12. In any event, the resultant double connection between components 1 and 2, as shown in FIGS. 1-4, strengthens the support for the cover 8 and will serve to transmit loading thereon into the plane of the channel side wall. Such a connection is preferable when the channel cover is to be loaded by walking thereon or used by vehicles riding thereover. Indeed, in the case of very heavy loads, it may be appropriate to reinforce the components, or to locate an additional reinforcement plate between the tongue 15 and the base of the corner component 4 therebelow.

Since reference has been made to the use of a snap fit, it is appropriate to note that plastics material is preferred in the manufacture of the standard, strip-like channel components in order to provide desired resilience. However, the material should not be so soft as to render connections non-positive or reduce the mechanical strength of the components and resultant channel. The material should be sufficiently hard to afford a substantially positive snap connection. In the event that high mechanical strength is required, the above-proposed reinforcement can take the form of an undersize metal component coated with plastics material to afford resilience. Plastics material and coatings are advantageous in any case in allowing continuous production by extrusion processes, their lack of, or resistance to, corrosion, their desirable insulating properties, and so on. For these reasons, it may be appropriate for the cover 8 and any partition walls, floors or other such components to be made in a similar manner.

While the invention has been described with special reference to particular shape components, this is not intended to limit the invention as defined by the appended claims. For example, the component 1 is strong in its connection with component 2 and can receive cover connections in its uppermost grooves; however, a simplified uppermost component can be formed by removal of the uppermost inner groove wall of component 2 down to the upper surface of extension 15.

What is claimed is:

1. A service installation channel comprising a plurality of elongated strip-like components interconnected in successive manner along their longitudinally extending peripheral edges with complementary tongue-and-groove joints that provide positive interlocking connection, there being at least two uppermost strip-like components forming each sidewall and with the two uppermost strip-like components of each side wall having a first tongue-and-groove joint similar to those between other adjacent pairs of interconnected strip-like components comprising the service installation channel and an additional interconnected tongue-and-groove joint extending laterally inwardly adjacent said first tongue-and-groove joint.

2. A channel according to claim 1 wherein each groove formed in a longitudinally extending peripheral edge is undercut towards its bottom and the complementary tongue formed on the adjacent strip-like component has a lateral flange at its outermost edge for receipt in said undercut.

3. A channel according to claim 2 wherein said flange is outwardly convergently tapered to facilitate release of the relevant joint.

4. A channel according to claim 3 wherein each of said strip-like components comprise resilient material to render said joints snap fitting in nature.

5. A channel according to claim 4 wherein at least one of said components has an inward projection to receive and support an equipment part, a partition wall, an intermediate floor, or other additional member.

6. A channel according to claim 5 wherein each intermediate strip-like component, excluding those uppermost in the channel side walls, have substantially identical complementary tongue or groove connections formed on the longitudinally extending edges thereof.

* * * * *